US009977201B2

(12) United States Patent
Enya et al.

(10) Patent No.: US 9,977,201 B2
(45) Date of Patent: May 22, 2018

(54) OPTICAL MODULE THAT SUPPRESSES STRAY LIGHT (71) Applicant: Sumitomo Electric Industries, Ltd., Osaka-shi (JP)

(72) Inventors: Yohei Enya, Itami (JP); Hiromi Nakanishi, Itami (JP); Kuniaki Ishihara, Itami (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days. days.

(21) Appl. No.: 15/647,491

(22) Filed: Jul. 12, 2017

(65) Prior Publication Data

US 2018/0017746 A1    Jan. 18, 2018

(30) Foreign Application Priority Data

Jul. 12, 2016  (JP) ................ 2016-137997

(51) Int. Cl.
*G02B 6/42* (2006.01)
*G02B 6/293* (2006.01)
*F21S 8/10* (2006.01)

(52) U.S. Cl.
CPC ......... *G02B 6/4246* (2013.01); *F21S 41/147* (2018.01); *F21S 48/1159* (2013.01); *G02B 6/2938* (2013.01); *G02B 6/29346* (2013.01); *G02B 6/4209* (2013.01)

(58) Field of Classification Search
CPC  G02B 6/4246; G02B 6/29346; G02B 6/2938; G02B 6/4209; F21S 41/147
See application file for complete search history.

(56) References Cited

U.S. PATENT DOCUMENTS

| 2012/0148192 A1* | 6/2012 | Nakanishi | G02B 6/4206 385/33 |
| 2013/0011104 A1* | 1/2013 | Sato | G02B 6/4244 385/93 |
| 2018/0019568 A1* | 1/2018 | Kyono | H01S 5/022 |
| 2018/0024303 A1* | 1/2018 | Nakanishi | G02B 6/424 |

FOREIGN PATENT DOCUMENTS

| JP | 61-095590 A | 5/1986 |
| JP | 2004-165299 A | 6/2004 |
| JP | 2007-017925 A | 1/2007 |
| JP | 2007-065600 A | 3/2007 |
| JP | 2007-328895 A | 12/2007 |
| JP | 2009-093101 A | 4/2009 |
| JP | 2016-096219 A | 5/2016 |

* cited by examiner

*Primary Examiner* — Tracie Y Green
(74) *Attorney, Agent, or Firm* — Venable LLP; Michael A. Sartori; Miguel A. Lopez

(57) ABSTRACT

An optical module includes a light-forming part and a protective member. The light-forming part includes a base member, a semiconductor light-emitting device, a lens, and a light-receiving device mounted on the base member and disposed, in the emission direction of the semiconductor light-emitting device, between the semiconductor light-emitting device and the lens. The light-receiving surface of the light-receiving device inclines toward the emission portion of the semiconductor light-emitting device such that an inclination angle θ is more than 0° and 90° or less, the inclination angle θ being an angle formed between the optical axis of the semiconductor light-emitting device and a plane including the light-receiving surface of the light-receiving device.

7 Claims, 12 Drawing Sheets

OPTICAL MODULE THAT SUPPRESSES STRAY LIGHT

BACKGROUND OF THE INVENTION

1. Field of the Invention

The present invention relates to an optical module.

This application claims priority based on Japanese Patent Application No. 2016-137997 filed in the Japan Patent Office on Jul. 8, 2016, and the entire contents of this Japanese Patent Application are incorporated herein by reference.

2. Description of the Related Art

There are known optical modules that include semiconductor light-emitting devices within packages (for example, refer to Japanese Unexamined Patent Application Publication Nos. 2009-93101, 2007-328895, 2007-17925, and 2007-65600). Such optical modules are used as light sources of various apparatuses such as display apparatuses, optical pickup apparatuses, and optical communication apparatuses.

In such an optical module, the intensity of light emitted from the semiconductor light-emitting device needs to be appropriately adjusted. The intensity of the light can be adjusted by receiving, with a light-receiving device, a portion of the light emitted from the semiconductor light-emitting device to determine the intensity of the light, and by adjusting, on the basis of feedback of the determined intensity, the electric power supplied to the semiconductor light-emitting device. A structure that sends a portion of light emitted from the semiconductor light-emitting device to the light-receiving device is, for example, a structure in which optical components such as a filter and a mirror are used to separate a portion of light emitted from the semiconductor light-emitting device and to send the separated portion of light to the light-receiving device (for example, refer to Japanese Unexamined Patent Application Publication Nos. 2009-93101 and 2007-328895).

SUMMARY OF THE INVENTION

An optical module according to an embodiment of the present invention includes a light-forming part configured to form light; and a protective member that includes an output window configured to transmit light from the light-forming part and that is disposed so as to surround the light-forming part. The light-forming part includes a base member, a semiconductor light-emitting device mounted on the base member, a lens mounted on the base member and configured to convert, in terms of spot size, light emitted from the semiconductor light-emitting device, and a light-receiving device that is mounted on the base member, that is disposed, in an emission direction of the semiconductor light-emitting device, between the semiconductor light-emitting device and the lens, that includes a light-receiving surface, and that is configured to directly receive, at the light-receiving surface, light from the semiconductor light-emitting device. In this optical module, the light-receiving surface inclines toward an emission portion of the semiconductor light-emitting device such that an inclination angle is more than 0° and 90° or less, the inclination angle being an angle formed between an optical axis of the semiconductor light-emitting device and a plane including the light-receiving surface of the light-receiving device.

DESCRIPTION OF THE PREFERRED EMBODIMENTS

Technical Problem

In existing optical modules, light emitted from a semiconductor light-emitting device may be reflected within such an optical module, which may result in generation of light (stray light) reaching an unintended region outside of the optical module. In optical modules, such stray light needs to be suppressed. Accordingly, an object is to provide an optical module that enables suppression of stray light.

Advantageous Effects of the Disclosure

An optical module according to the present disclosure enables suppression of stray light.

Description of Embodiments

Some embodiments according to the present disclosure will be first listed and described. An optical module according to an embodiment includes a light-forming part configured to form light; and a protective member that includes an output window configured to transmit light from the light-forming part and that is disposed so as to surround the light-forming part. The light-forming part includes a base member, a semiconductor light-emitting device mounted on the base member, a lens mounted on the base member and configured to convert, in terms of spot size, light emitted from the semiconductor light-emitting device, and a light-receiving device that is mounted on the base member, that is disposed, in an emission direction of the semiconductor light-emitting device, between the semiconductor light-emitting device and the lens, that includes a light-receiving surface, and that is configured to directly receive, at the light-receiving surface, light from the semiconductor light-emitting device. In this optical module, the light-receiving surface inclines toward an emission portion of the semiconductor light-emitting device such that an inclination angle is more than 0° and 90° or less, the inclination angle being an angle formed between an optical axis of the semiconductor light-emitting device and a plane including the light-receiving surface of the light-receiving device.

The light-receiving device is disposed between the semiconductor light-emitting device and the lens so as to directly receive light emitted from the semiconductor light-emitting device. At the time of this direct reception, a portion of light being incident on the light-receiving device is reflected by the light-receiving surface of the light-receiving device. The reflected light due to reflection by the light-receiving surface of the light-receiving device may become stray light reaching an unintended region outside of the optical module.

In the optical module according to this embodiment, the light-receiving device is disposed such that the light-receiving surface of the light-receiving device inclines toward the emission portion of the semiconductor light-emitting device. This configuration enables suppression of entry of light reflected by the light-receiving surface, into the lens. This enables a reduction in the amount of light that is reflected by the light-receiving surface and that is outputted from the optical module. In this way, a reduction in the amount of stray light is achieved. Specifically, the light-receiving surface of the light-receiving device inclines toward the emission portion of the semiconductor light-emitting device such that an inclination angle is more than 0° and 90° or less, the inclination angle being an angle formed between the optical axis of the semiconductor light-emitting device and a plane including the light-receiving surface of the light-receiving device. This configuration enables suppression of stray light.

The above-described inclination angle may be 5° or more. When the inclination angle is 5° or more, stray light can be suppressed with more certainty.

The above-described inclination angle may be 45° or less. When the inclination angle is 45° or less, suppression of stray light can be achieved while a sufficiently high sensitivity of the light-receiving device is maintained.

The above-described inclination angle may be 30° or less. When the light-receiving surface of the light-receiving device inclines toward the emission portion of the semiconductor light-emitting device such that the inclination angle is 30° or less, suppression of stray light can be achieved while a high sensitivity of the light-receiving device is maintained.

In the above-described optical module, the semiconductor light-emitting device may be a laser diode. In this case, emitted light having less variation in the wavelength can be obtained.

In the above-described optical module, the light-forming part may include a plurality of the semiconductor light-emitting devices mounted on the base member, a plurality of the lenses mounted on the base member, and disposed so as to individually correspond to the plurality of semiconductor light-emitting devices, the light-receiving device mounted on the base member, and disposed so as to correspond to at least one semiconductor light-emitting device of the plurality of semiconductor light-emitting devices, and a wavelength selective filter mounted on the base member, and configured to multiplex light from the plurality of semiconductor light-emitting devices.

In this case, plural semiconductor light-emitting devices are disposed within a single package and light from these semiconductor light-emitting devices can be multiplexed within the package. This configuration enables a reduction in the size of an apparatus including the optical module, compared with a case of multiplexing light from plural packages. Alternatively, instead of the wavelength selective filter, a polarization synthesizing filter may be employed, for example.

In the above-described optical module, the plurality of semiconductor light-emitting devices may include a semiconductor light-emitting device configured to emit red light, a semiconductor light-emitting device configured to emit green light, and a semiconductor light-emitting device configured to emit blue light. This configuration enables multiplexing of such light to form light of a desired color.

Details of Embodiments

Figure 1:
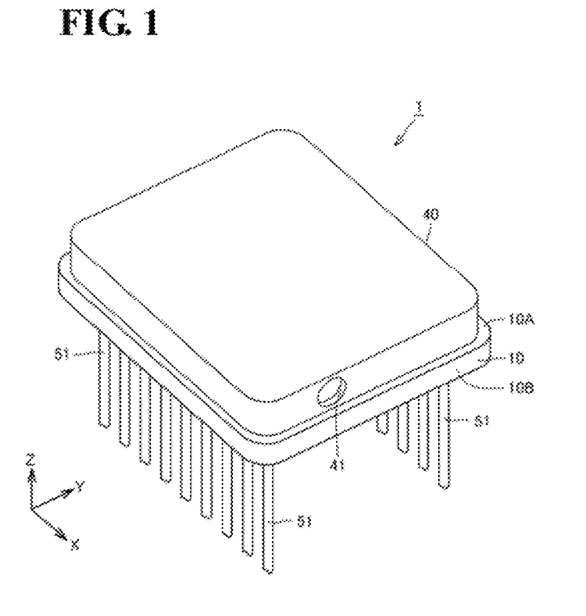
FIG. 1 is a schematic perspective view illustrating the structure of an optical module according to an embodiment.
Figure 2:
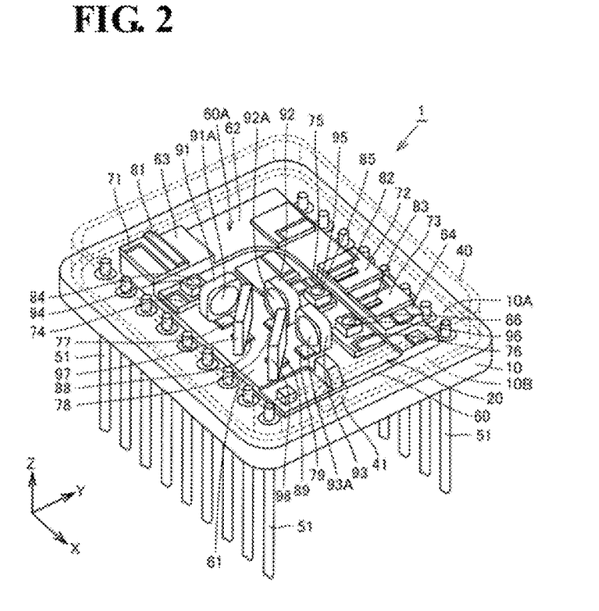
FIG. 2 is a schematic perspective view illustrating the structure of an optical module according to an embodiment.

Hereinafter, an optical module according to an embodiment of the present disclosure will be described with reference to FIG. 1 to FIG. 6. FIG. 2 corresponds to a state in which a cap 40 in FIG. 1 is detached. In the drawings below, like or corresponding elements are denoted by like reference numerals and redundant descriptions thereof will be omitted.

Referring to FIG. 1 and FIG. 2, an optical module 1 according to this embodiment includes a stem 10 having the shape of a flat plate; a light-forming part 20 disposed on one main surface 10A of the stem 10 and configured to form light; a cap 40 disposed on and in contact with the one main surface 10A of the stem 10 so as to cover the light-forming part 20; and plural lead pins 51 that extend through the stem 10 from the other main surface 10B side to the one main surface 10A side and protrude from both of the one main surface 10A and the other main surface 10B. The stem 10 and the cap 40 are, for example, welded together to provide a hermetically sealed state. In other words, the light-forming part 20 is hermetically sealed by the stem 10 and the cap 40. The space surrounded by the stem 10 and the cap 40 contains, for example, a gas having a reduced water content (moisture is removed), such as dry air. The cap 40 has an output window 41, which transmits light from the light-forming part 20. The output window may have the shape of a flat plate whose main surfaces are parallel to each other, or may have the shape of a lens that condenses or diffuses light from the light-forming part 20. The stem 10 and the cap 40 constitute a protective member.

Figure 3:
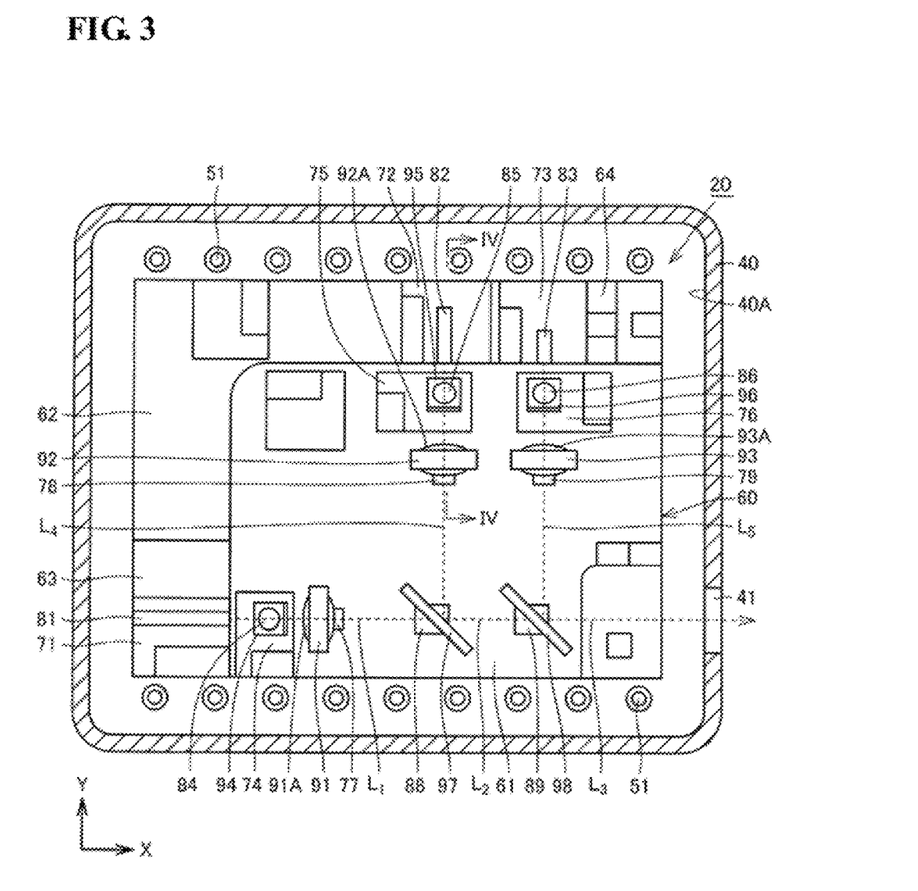
FIG. 3 is a schematic plan view illustrating the structure of an optical module according to an embodiment.

Referring to FIG. 2 and FIG. 3, the light-forming part 20 includes a base plate 60, which is a base member having the shape of a plate. The base plate 60 has one main surface 60A, which has a rectangular shape in plan view. The base plate 60 includes a base region 61 and a chip mount region 62. The chip mount region 62 is formed in a region including one short side and one long side of the one main surface 60A, the one long side being connected to the one short side. The chip mount region 62 has a larger thickness than the base region 61. As a result, the chip mount region 62 has a larger height than the base region 61. The chip mount region 62 includes a first chip mount region 63, which is formed in a region on an end side of the one short side opposite to the other end side where the one short side is connected to the one long side, and which has a larger thickness (larger height) than the adjacent region. The chip mount region 62 also includes a second chip mount region 64, which is formed in a region on an end side of the one long side opposite to the other end side where the one long side is connected to the one short side, and which has a larger thickness (larger height) than the adjacent region.

On the first chip mount region 63, a first submount 71 having the shape of a flat plate is disposed. On the first submount 71, a red laser diode 81 is disposed as a first semiconductor light-emitting device. On the other hand, on the second chip mount region 64, a second submount 72 and a third submount 73 each having the shape of a flat plate are disposed. When viewed from the second submount 72, the third submount 73 is disposed on a side opposite to the other side where the one long side and the one short side are connected together. On the second submount 72, a green laser diode 82 is disposed as a second semiconductor light-emitting device. On the third submount 73, a blue laser diode 83 is disposed as a third semiconductor light-emitting device. The heights of the optical axes of the red laser diode 81, the green laser diode 82, and the blue laser diode 83 (the distances between each optical axis and a reference surface that is the one main surface 60A of the base plate 60; the distances from the reference surface in the Z-axis direction) are adjusted to be the same by means of the first submount 71, the second submount 72, and the third submount 73.

On the base region 61 of the base plate 60, a fourth submount 74, a fifth submount 75, and a sixth submount 76 are disposed. On the fourth submount 74, the fifth submount 75, and the sixth submount 76, respectively, a first photodiode 94 as a first light-receiving device, a second photodiode 95 as a second light-receiving device, and a third photodiode 96 as a third light-receiving device are disposed. The fourth submount 74, the fifth submount 75, and the sixth submount 76 are respectively used to adjust the heights of the first photodiode 94, the second photodiode 95, and the third photodiode 96 (distances to the optical axes of the red laser diode 81, the green laser diode 82, and the blue laser diode 83; the distances in the Z-axis direction). Details of the adjustment of the heights of the first photodiode 94, the second photodiode 95, and the third photodiode 96 will be described later. The first photodiode 94, the second photodiode 95, and the third photodiode 96 are respectively disposed at positions where they directly receive light from the red laser diode 81, the green laser diode 82, and the blue laser diode 83. In this embodiment, the light-receiving devices are disposed so as to individually correspond to all the semiconductor light-emitting devices. The first photodiode 94, the second photodiode 95, and the third photodiode 96 are photodiodes respectively configured to receive red light, green light, and blue light. The first photodiode 94 is disposed, in the emission direction of the red laser diode 81, between the red laser diode 81 and a first lens 91. The second photodiode 95 is disposed, in the emission direction of the green laser diode 82, between the green laser diode 82 and a second lens 92. The third photodiode 96 is disposed, in the emission direction of the blue laser diode 83, between the blue laser diode 83 and a third lens 93.

On the base region 61 of the base plate 60, protrusion parts that are a first lens holding part 77, a second lens holding part 78, and a third lens holding part 79 are formed. On the first lens holding part 77, the second lens holding part 78, and the third lens holding part 79, respectively, the first lens 91, the second lens 92, and the third lens 93 are disposed. The first lens 91, the second lens 92, and the third lens 93 respectively have lens portions 91A, 92A, and 93A whose surfaces are lens surfaces. The first lens 91, the second lens 92, and the third lens 93 are each molded in one piece in terms of the lens portions 91A, 92A, and 93A and regions other than the lens portions 91A, 92A, and 93A. The first lens holding part 77, the second lens holding part 78, and the third lens holding part 79 are used to adjust the central axes of the lens portions 91A, 92A, and 93A of the first lens 91, the second lens 92, and the third lens 93, that is, the optical axes of the lens portions 91A, 92A, and 93A, so as to respectively align with the optical axes of the red laser diode 81, the green laser diode 82, and the blue laser diode 83. The first lens 91, the second lens 92, and the third lens 93 respectively convert, in terms of spot size, light emitted from the red laser diode 81, the green laser diode 82, and the blue laser diode 83. The first lens 91, the second lens 92, and the third lens 93 are configured to convert, in terms of spot size, light emitted from the red laser diode 81, the green laser diode 82, and the blue laser diode 83 such that the resultant spot sizes are the same.

On the base region 61 of the base plate 60, a first filter 97 and a second filter 98 are disposed. The first filter 97 and the second filter 98 each have the shape of a flat plate whose main surfaces are parallel to each other. The first filter 97 and the second filter 98 are, for example, wavelength selective filters. The first filter 97 and the second filter 98 are dielectric multilayer film filters. More specifically, the first filter 97 transmits red light, but reflects green light. The second filter 98 transmits red light and green light, but reflects blue light. Thus, the first filter 97 and the second filter 98 selectively transmit and reflect light of specific wavelengths. As a result, the first filter 97 and the second filter 98 multiplex light emitted from the red laser diode 81, the green laser diode 82, and the blue laser diode 83. The first filter 97 and the second filter 98 are respectively disposed on a first protrusion region 88 and a second protrusion region 89, which are protrusion parts formed on the base region 61.

Referring to FIG. 3, the red laser diode 81, a light-receiving portion 84 of the first photodiode 94, the lens portion 91A of the first lens 91, the first filter 97, and the second filter 98 are disposed so as to be arranged in a line extending in the emission direction of light from the red laser diode 81 (arranged in the X-axis direction). The green laser diode 82, a light-receiving portion 85 of the second photodiode 95, the lens portion 92A of the second lens 92, and the first filter 97 are disposed so as to be arranged in a line extending in the emission direction of light from the green laser diode 82 (arranged in the Y-axis direction). The blue laser diode 83, a light-receiving portion 86 of the third photodiode 96, the lens portion 93A of the third lens 93, and the second filter 98 are disposed so as to be arranged in a line extending in the emission direction of light from the blue laser diode 83 (arranged in the Y-axis direction). Thus, the emission direction of the red laser diode 81 intersects the emission directions of the green laser diode 82 and the blue laser diode 83. More specifically, the emission direction of the red laser diode 81 is orthogonal to the emission directions of the green laser diode 82 and the blue laser diode 83. The emission direction of the green laser diode 82 corresponds to the emission direction of the blue laser diode 83. More specifically, the emission direction of the green laser diode 82 is parallel to the emission direction of the blue laser diode 83. The main surfaces of the first filter 97 and the second filter 98 incline with respect to the emission direction of light from the red laser diode 81. More specifically, the main surfaces of the first filter 97 and the second filter 98 incline at 45° with respect to the emission direction of light from the red laser diode 81 (the X-axis direction).

Hereinafter, operations of the optical module 1 according to this embodiment will be described. Referring to FIG. 3, red light emitted from the red laser diode 81 travels along an optical path $L_1$. At this time, a portion of the red light directly enters the light-receiving portion 84 of the first photodiode 94. Thus, the intensity of the red light emitted from the red laser diode 81 is determined; and the intensity of the red light is adjusted on the basis of the difference between the determined intensity of the light and the target intensity of the emitted light. The red light having passed above the first photodiode 94, enters the lens portion 91A of the first lens 91, so that the light is converted in terms of spot size. Specifically, for example, the red light emitted from the red laser diode 81 is converted into collimated light. The red light having been converted in terms of spot size at the first lens 91, travels along the optical path $L_1$, and enters the first filter 97. The first filter 97 transmits red light, so that the light emitted from the red laser diode 81 further travels along an optical path $L_2$, and enters the second filter 98. The second filter 98 transmits red light, so that the light emitted from the red laser diode 81 further travels along an optical path $L_3$, and is outputted through the output window 41 of the cap 40 to the outside of the optical module 1.

Green light emitted from the green laser diode 82 travels along an optical path $L_4$. At this time, a portion of the green light directly enters the light-receiving portion 85 of the second photodiode 95. Thus, the intensity of the green light emitted from the green laser diode 82 is determined; and the intensity of the green light is adjusted on the basis of the difference between the determined intensity of the light and the target intensity of the emitted light. The green light having passed above the second photodiode 95, enters the lens portion 92A of the second lens 92, so that the light is converted in terms of spot size. Specifically, for example, the green light emitted from the green laser diode 82 is converted into collimated light. The green light having been converted in terms of spot size at the second lens 92, travels along the optical path $L_4$, and enters the first filter 97. The first filter 97 reflects green light, so that the light emitted from the green laser diode 82 joins the optical path $L_2$. As a result, the green light is multiplexed with the red light, travels along the optical path $L_2$, and enters the second filter 98. The second filter 98 transmits green light, so that the light emitted from the green laser diode 82 further travels along the optical path $L_3$, and is outputted through the output window 41 of the cap 40 to the outside of the optical module 1.

Blue light emitted from the blue laser diode 83 travels along an optical path $L_5$. At this time, a portion of the blue light directly enters the light-receiving portion 86 of the third photodiode 96. Thus, the intensity of the blue light emitted from the blue laser diode 83 is determined; and the intensity of the blue light is adjusted on the basis of the difference between the determined intensity of the light and the target intensity of the emitted light. The blue light having passed above the third photodiode 96, enters the lens portion 93A of the third lens 93, so that the light is converted in terms of spot size. Specifically, for example, the blue light emitted from the blue laser diode 83 is converted into collimated light. The blue light having been converted in terms of spot size at the third lens 93, travels along the optical path $L_5$, and enters the second filter 98. The second filter 98 reflects blue light, so that the light emitted from the blue laser diode 83 joins the optical path $L_3$. As a result, the blue light is multiplexed with the red light and the green light, travels along the optical path $L_3$, and is outputted through the output window 41 of the cap 40 to the outside of the optical module 1.

In this way, light formed by multiplexing red light, green light, and blue light is outputted through the output window 41 of the cap 40. Note that, in the optical module 1 according to this embodiment, portions of light emitted from the red laser diode 81, the green laser diode 82, and the blue laser diode 83 are directly received by the first photodiode 94, the second photodiode 95, and the third photodiode 96, which are respectively disposed between the red laser diode 81 and the first lens 91, between the green laser diode 82 and the second lens 92, and between the blue laser diode 83 and the third lens 93.

Hereinafter, details of the arrangement of the first photodiode 94, the second photodiode 95, and the third photodiode 96 will be described with reference to an example about the second photodiode 95. The positional relationship of the first photodiode 94 with respect to the red laser diode 81 and the positional relationship of the third photodiode 96 with respect to the blue laser diode 83 are the same as the following positional relationship of the second photodiode 95 with respect to the green laser diode 82.

Figure 4:
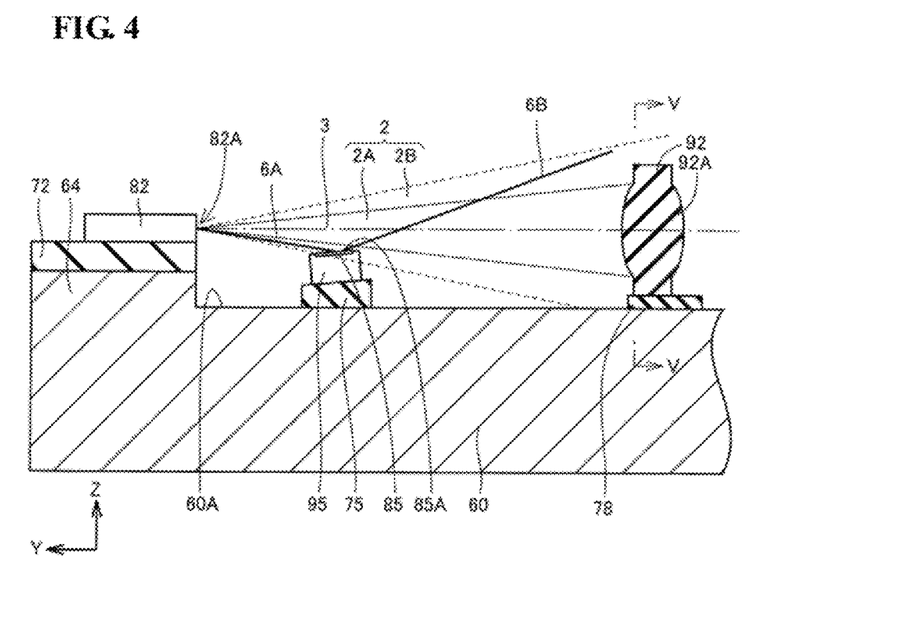
FIG. 4 is a schematic sectional view taken along line IV-IV in FIG. 3.
Figure 5:
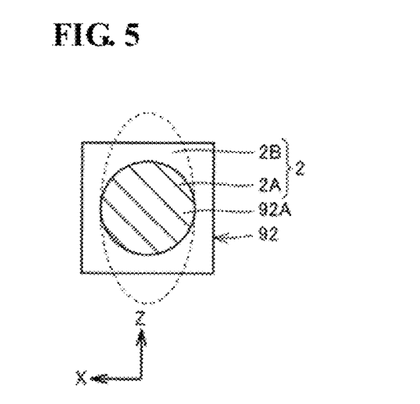
FIG. 5 is a schematic view illustrating the relationship between the shape of light and a lens in a section taken along line V-V in FIG. 4.

Referring to FIG. 4 and FIG. 5, green light 2 emitted from an emission portion 82A of the green laser diode 82 serving as a semiconductor light-emitting device, has the shape of an ellipse in a section perpendicular to an optical axis 3 of the green laser diode 82 (the section in FIG. 5), the ellipse having a major axis in a direction perpendicular to the one main surface 60A of the base plate 60 (the Z-axis direction). The lens portion 92A of the second lens 92 has the shape of a circle in the section perpendicular to the optical axis 3 of the green laser diode 82. As illustrated in FIG. 5, the second lens 92 is disposed such that, in the section perpendicular to the optical axis 3 of the green laser diode 82, the circle forming the outer circumferential surface of the lens portion 92A overlaps a portion of the ellipse corresponding to the light 2. In this case, the light 2 includes a region 2A subjected to spot-size conversion using the second lens 92, and a region 2B not subjected to the spot-size conversion. Referring to FIG. 4, the second photodiode 95 is disposed at a position such that the light-receiving portion 85 of the second photodiode 95 as a light-receiving device is configured to receive light in the region 2B, which is the region other than the region 2A subjected to spot-size conversion using the second lens 92.

The light-receiving portion 85 of the second photodiode 95 is configured to directly receive, at a light-receiving surface 85A, light in the region 2B of the green light 2 emitted from the emission portion 82A of the green laser diode 82. At the time of this direct reception, a portion of incident light 6A incident on the second photodiode 95 is reflected by the light-receiving surface 85A. When reflected light 6B due to reflection by the light-receiving surface 85A passes through, in the second lens 92, the region of the lens portion 92A for spot-size conversion of light, the resultant light is then reflected by the first filter 97 to reach an unintended region outside of the optical module 1.

Figure 6:
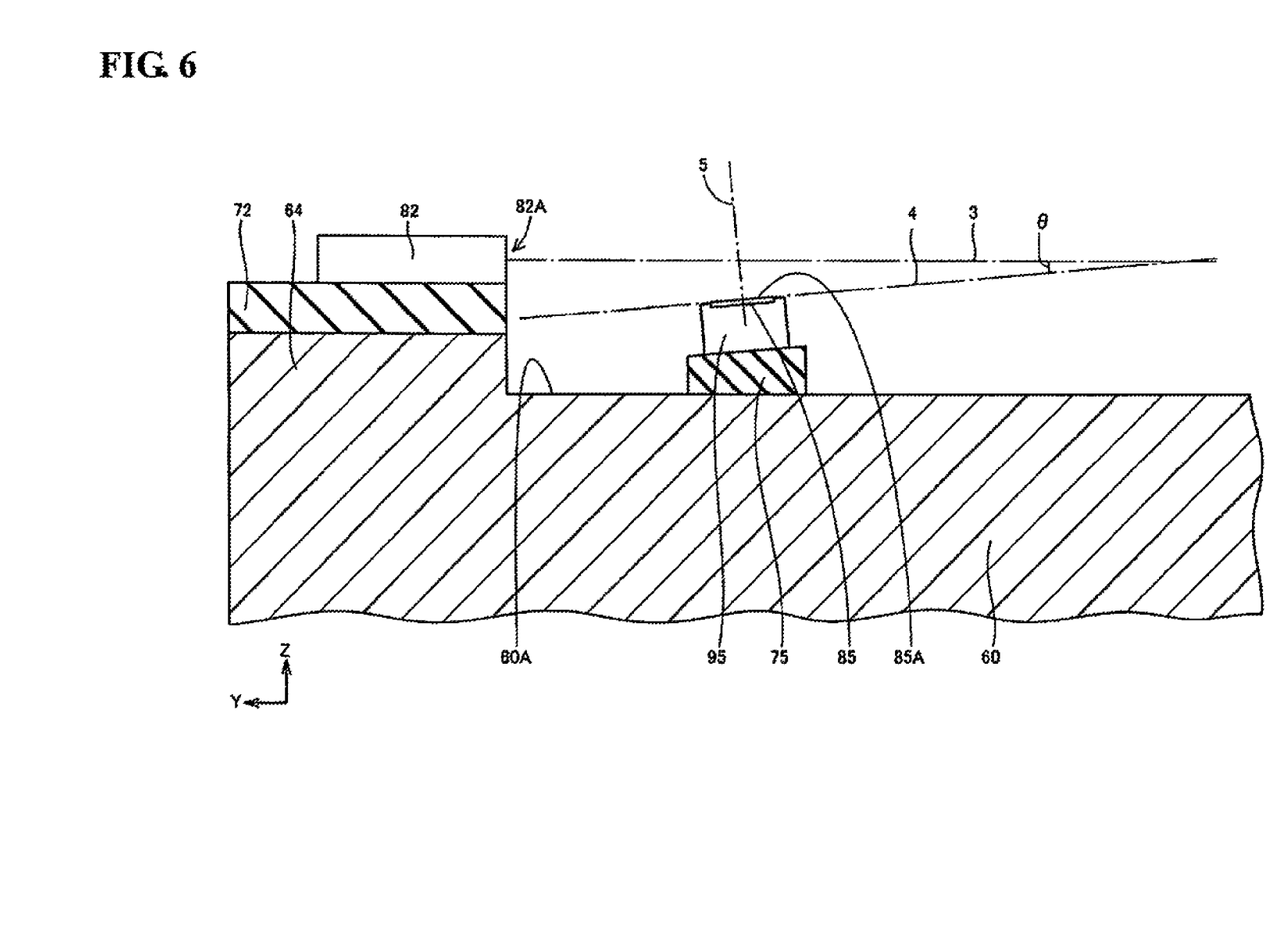
FIG. 6 is a schematic enlarged sectional view illustrating the state of a light-receiving device disposed with respect to a semiconductor light-emitting device.

FIG. 6 is a schematic enlarged sectional view illustrating the state of the second photodiode 95 serving as a light-receiving device and being disposed with respect to the green laser diode 82 serving as a semiconductor light-emitting device. Referring to FIG. 6, the second photodiode 95 is disposed such that the light-receiving surface 85A of the second photodiode 95 inclines toward the emission portion 82A. Stated another way, the second photodiode 95 is disposed such that, with respect to a direction perpendicular to the main surface 60A of the base plate 60, a normal line 5 of the light-receiving surface 85A of the second photodiode 95 as a light-receiving device inclines toward the green laser diode 82 as a semiconductor light-emitting device. In this embodiment, the light-receiving surface 85A of the light-receiving portion 85 of the second photodiode 95 inclines toward the emission portion 82A such that an inclination angle θ is more than 0° and 90° or less, the inclination angle θ being an angle formed between the optical axis 3 of the green laser diode 82 and a plane 4 including the light-receiving surface 85A.

The incident light 6A, which is emitted from the green laser diode 82 and is incident on the second photodiode 95, is reflected by the light-receiving surface 85A of the light-receiving portion 85 of the second photodiode 95. The reflected light 6B due to reflection by the light-receiving surface 85A is directed such that the reflected light 61 and the incident light 6A are symmetrical with respect to the normal line 5 of the light-receiving surface 85A. When the optical axis 3 of the green laser diode 82 and the plane including the light-receiving surface 85A are parallel to each other, the reflected light 6B may pass through the region 2A subjected to spot-size conversion using the second lens 92 and enter the lens 92.

By contrast, when the inclination angle θ is more than 0° and 90° or less, the reflected light 6B that passes through, in the second lens 92, the region of the lens portion 92A for spot-size conversion of light is suppressed. This enables suppression of stray light reaching an unintended region outside of the optical module.

In this embodiment, from the viewpoint of suppressing stray light, the inclination angle θ is preferably 5° or more, more preferably 10° or more. From the viewpoint of the sensitivity of the second photodiode 95, the inclination angle θ is preferably 45° or less, more preferably 30° or less.

Figure 7:
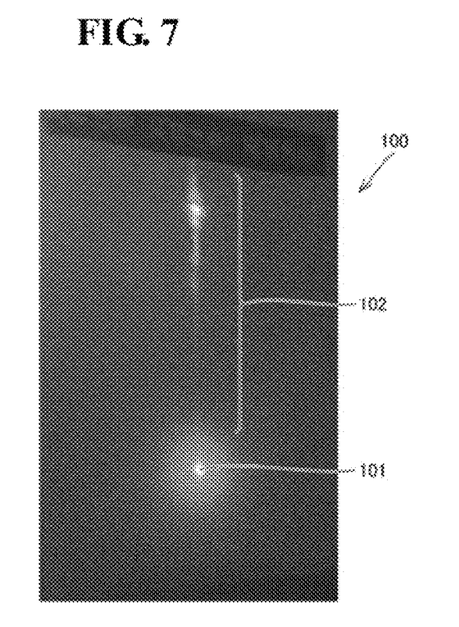
FIG. 7 is a photograph of light that is projected, the light being emitted from an optical module in a state where stray light is generated.
Figure 8:
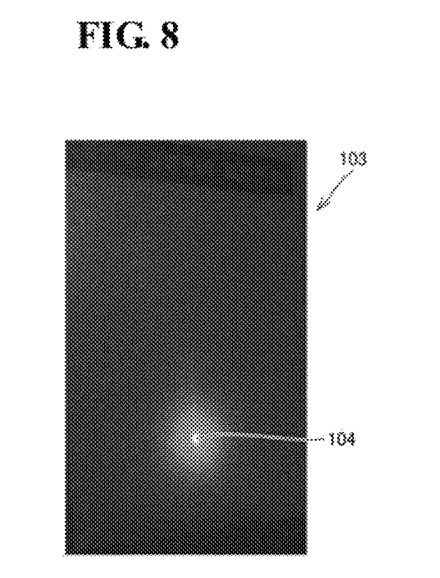
FIG. 8 is a photograph of light that is projected, the light being emitted from an optical module according to an embodiment.

Referring to FIG. 7 and FIG. 8, outputted light in the case where stray light is generated is compared with outputted light according to this embodiment where stray light is suppressed. FIG. 7 is an example of a photograph of light 2 that is projected, the light 2 being outputted from the optical module 1 when the inclination angle θ is 0° (that is, the light-receiving surface of the light-receiving device is parallel to the optical axis 3 of the laser diode 82) and stray light is generated. Referring to FIG. 7, a photograph 100 includes a spot 101 and an image of stray light 102, which are formed by projecting light onto a flat surface, the light being emitted along the optical axis of the laser diode.

FIG. 8 is an example of a photograph of light 2 that is projected, the light 2 being outputted from the optical module 1 according to this embodiment. In this photograph 103 in FIG. 8, the amount of the stray light 102 observed in FIG. 7 is considerably reduced. This result has demonstrated that the optical module 1 according to this embodiment enables a reduction in the amount of such stray light. This is achieved by the configuration of the optical module 1 in which a photodiode (a light-receiving device) is disposed such that the light-receiving surface of the photodiode inclines toward the emission portion of a laser diode (a semiconductor light-emitting device) at an inclination angle θ of more than 0° and 90° or less, the inclination angle θ being an angle formed between the optical axis of the laser diode and a plane including the light-receiving surface of the photodiode.

This embodiment has been described so far. Incidentally, the submounts 71, 72, and 73 are formed of a material that has a thermal expansion coefficient similar to the thermal expansion coefficients of devices or the like mounted on the submounts 71, 72, and 73. The submounts are formed of, for example, AlN, SiC, Si, or diamond. The material for forming the stem 10 and the cap 40 may be, for example, a material having a high thermal conductivity such as iron or copper, or may be, for example, AlN, CuW, or CuMo.

The above-described embodiment relates to a case of multiplexing light from three semiconductor light-emitting devices having different emission wavelengths. Alternatively, the number of semiconductor light-emitting devices may be one or two, or four or more. The above-described embodiment relates to a case of employing the laser diodes 81, 82, and 83 as semiconductor light-emitting devices. Alternatively, the semiconductor light-emitting devices may be light-emitting diodes, for example. The above-described embodiment relates to an example of employing wavelength selective filters as the first filter 97 and the second filter 98. Alternatively, these filters may be polarization synthesizing filters, for example. Alternatively, when only a single semiconductor light-emitting device is employed, the first filter 97 and the second filter 98 may be omitted.

EXAMPLES

Comparative Example and Example 1 to Example 6

In order to examine the relationship between the inclination angle θ and the presence or absence of stray light and the light-receiving sensitivity of the photodiode in the above-described embodiment, simulations were carried out as described below in Comparative Example and Example 1 to Example 6. The values of the inclination angle θ and evaluation results in Comparative Example and Examples are summarized in Table. The evaluation methods and evaluation grades for stray light and the light-receiving sensitivity are as follows.

Stray Light

Light outputted from an optical module was projected onto a wall surface, and the presence or absence of stray light was visually inspected. The evaluation grades are as follows.

A: No stray light is observed.
B: Stray light is slightly observed, but is sufficiently suppressed.
C: Prominent stray light is visually observed.

Light-Receiving Sensitivity

The light-receiving sensitivity of a photodiode as a light-receiving device was measured upon reception of light. In Table, the values of light-receiving sensitivity are expressed relative to the value of sensitivity in Example 6 that is defined as 1. The evaluation grades for light-receiving sensitivity are as follows.

A: The light-receiving sensitivity is very high.
B: The light-receiving sensitivity is high enough for practical use.
C: The light-receiving sensitivity is at the acceptable level.

Figure 9:
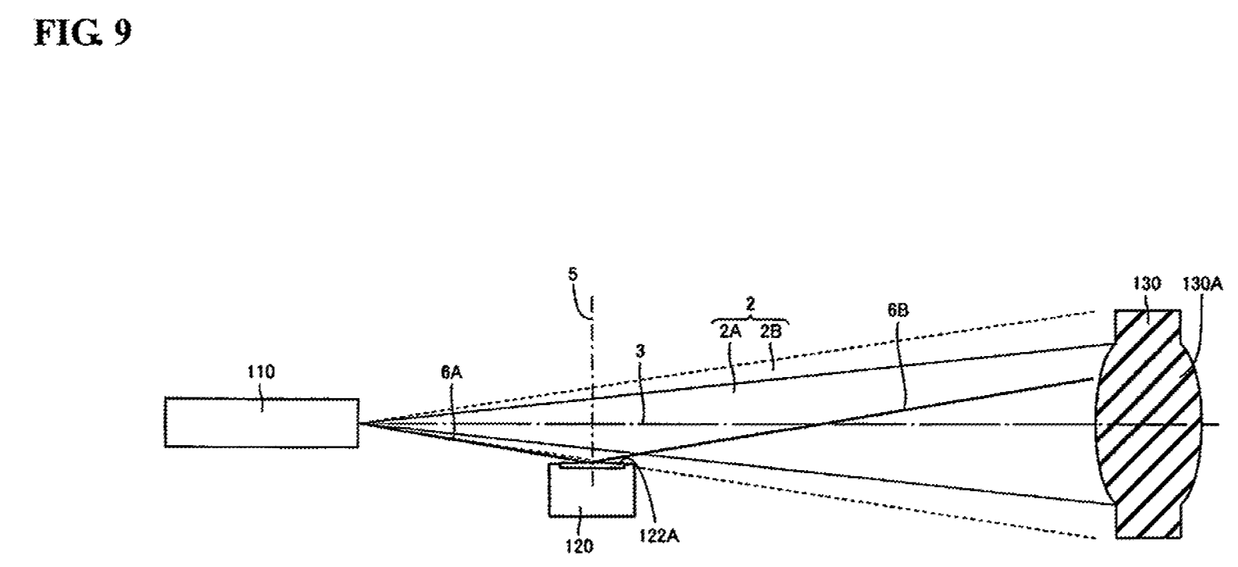
FIG. 9 is a schematic view illustrating the arrangement of a semiconductor light-emitting device and a light-receiving device in Comparative Example.

FIGS. 9 to 15 are schematic views illustrating the arrangements of a laser diode 110 as a semiconductor light-emitting device and a photodiode 120 as a light-receiving device in Comparative Example and Example 1 to Example 6. FIG. 9 is a schematic view illustrating the arrangement of the laser diode 110 and the photodiode 120 in Comparative Example. Light 2 emitted from the laser diode 110 includes a region 2A subjected to spot-size conversion using a lens portion 130A of a lens 130, and a region 2B not subjected to the spot-size conversion. The photodiode 120 as a light-receiving device receives, at a light-receiving surface 122A, the light in the region 2B. In FIG. 9, an optical axis 3 of the laser diode 110 is parallel to a plane 4 (not shown in FIGS. 9 to 15) including the light-receiving surface 122A of the photodiode 120. FIGS. 10 to 15 are schematic views illustrating the arrangements of the laser diode 110 and the photodiode 120 in Examples 1 to 6. In FIGS. 10 to 15, the inclination angles θ are 5° to 60°, the inclination angles θ each being an angle formed between the optical axis 3 of the laser diode 110 and the plane 4 including the light-receiving surface 122A of the photodiode 120. The values of inclination angles θ in Examples are summarized in Table.

TABLE

Figure 10:
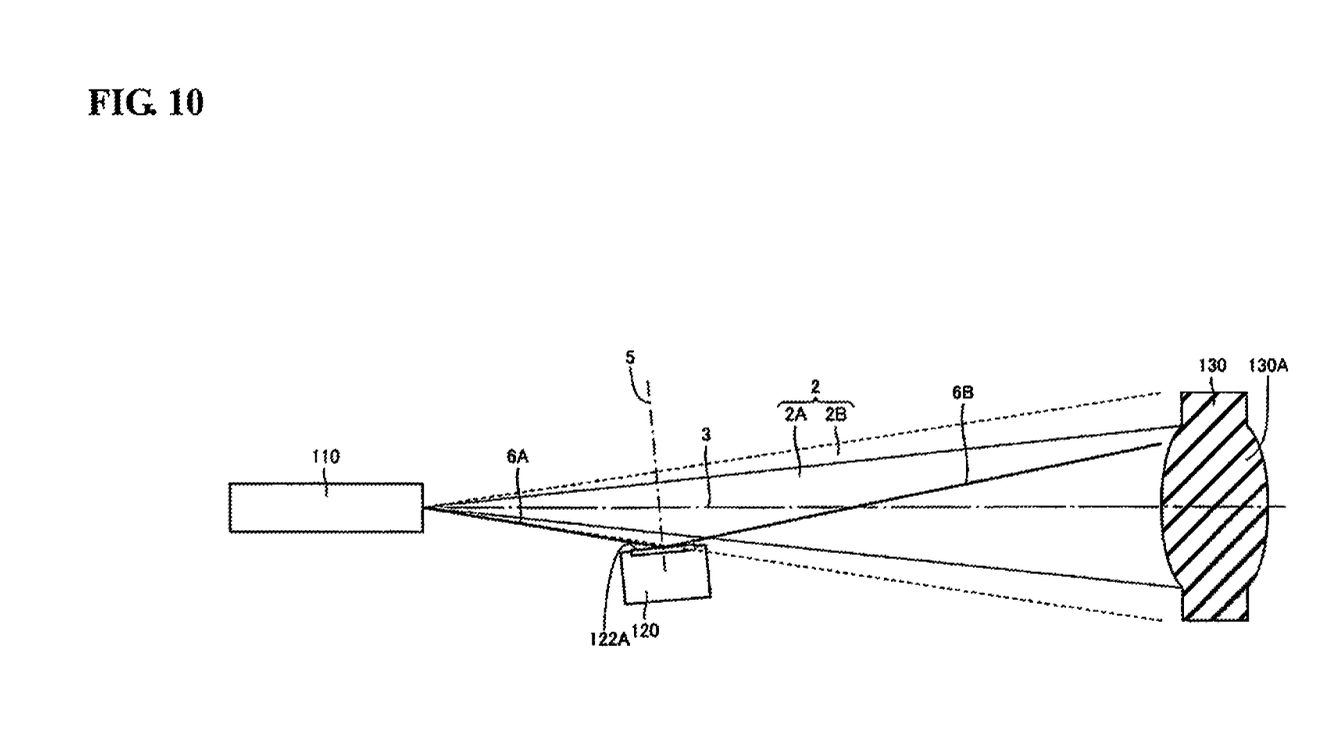
FIG. 10 is a schematic view illustrating the arrangement of a semiconductor light-emitting device and a light-receiving device in Example 1.
Figure 11:
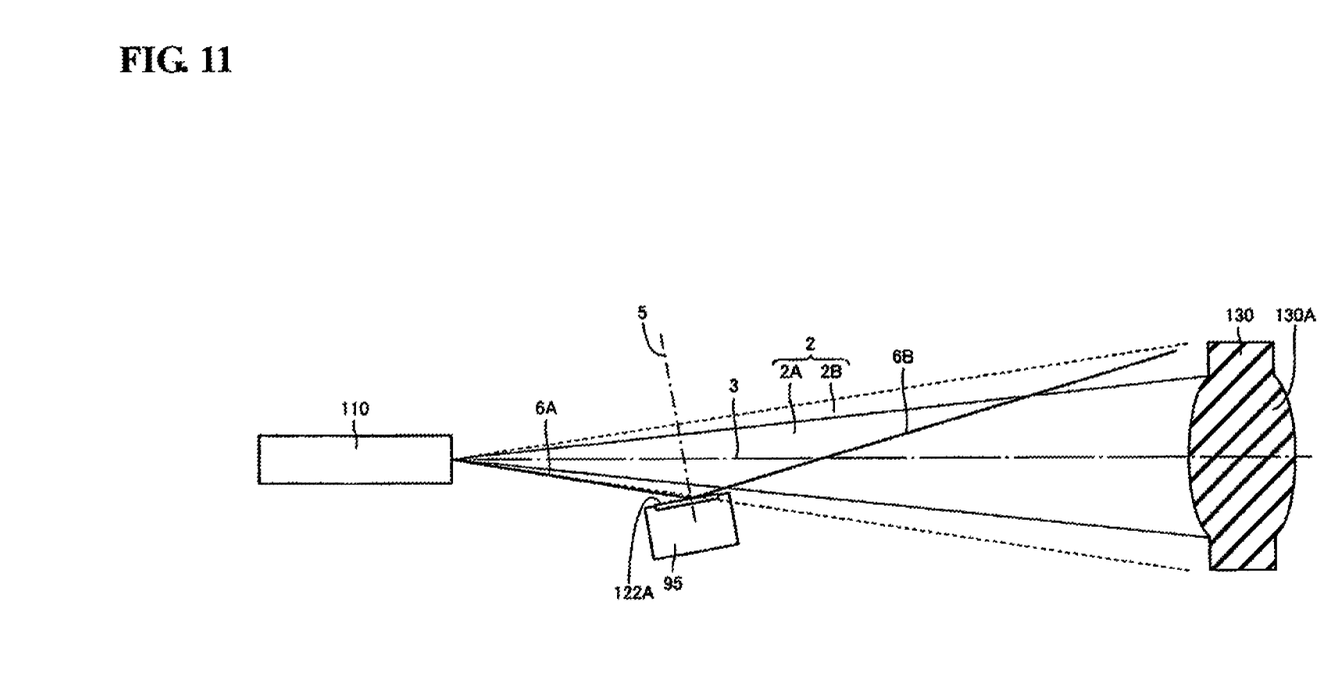
FIG. 11 is a schematic view illustrating the arrangement of a semiconductor light-emitting device and a light-receiving device in Example 2.
Figure 12:
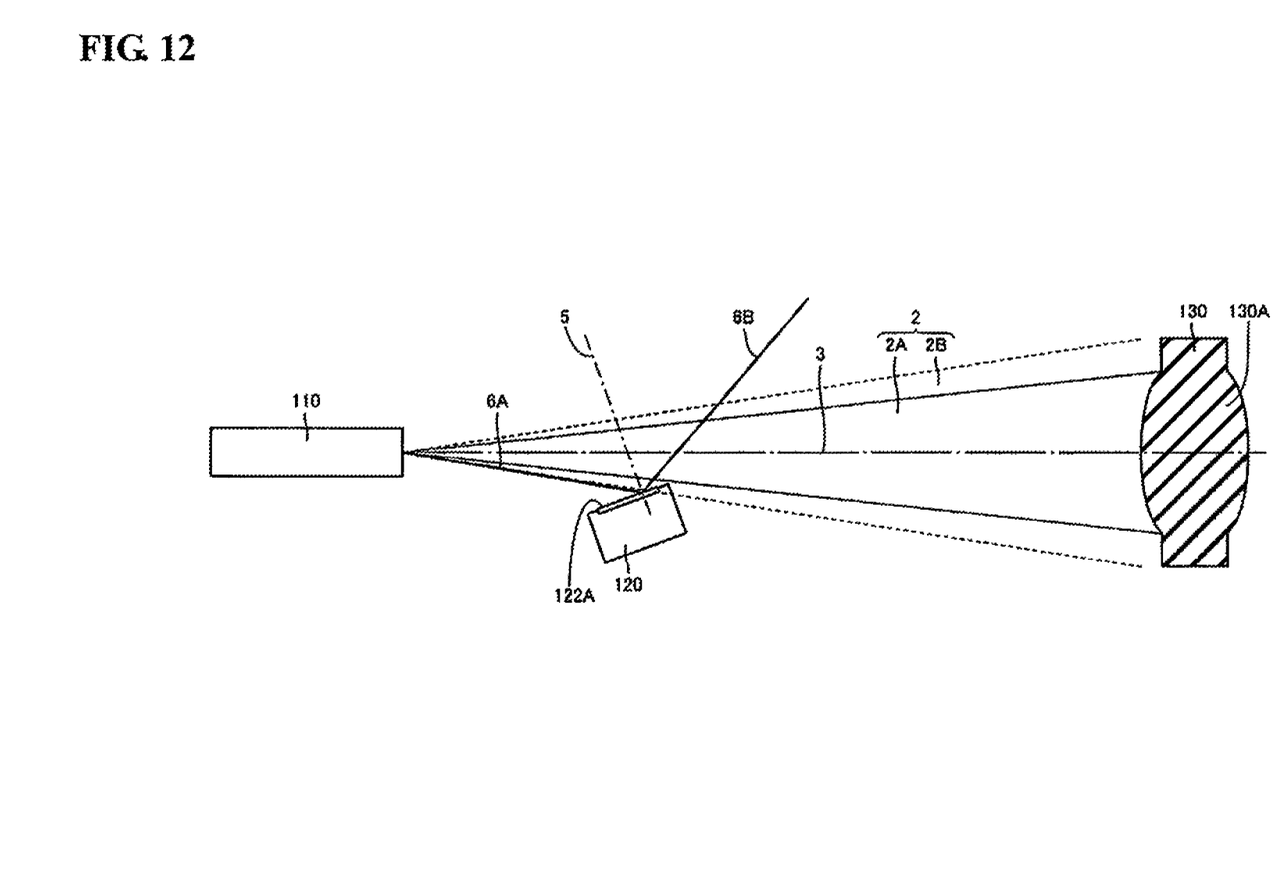
FIG. 12 is a schematic view illustrating the arrangement of a semiconductor light-emitting device and a light-receiving device in Example 3.
Figure 13:
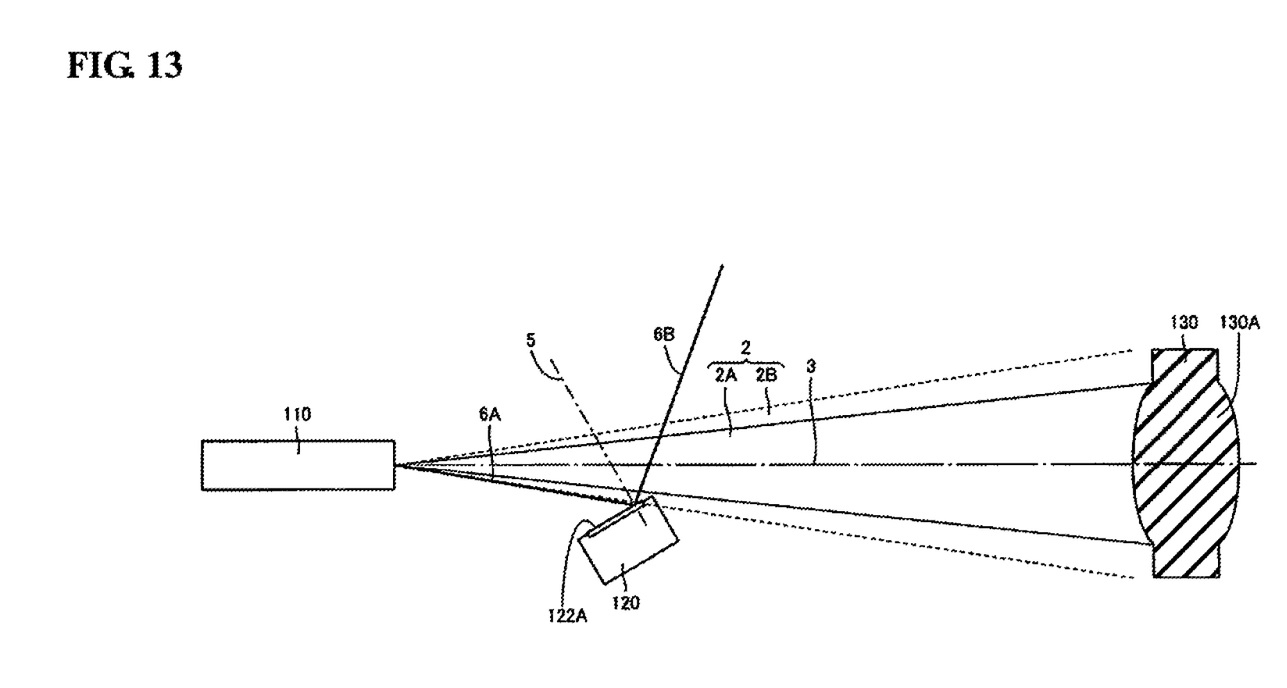
FIG. 13 is a schematic view illustrating the arrangement of a semiconductor light-emitting device and a light-receiving device in Example 4.
Figure 14:
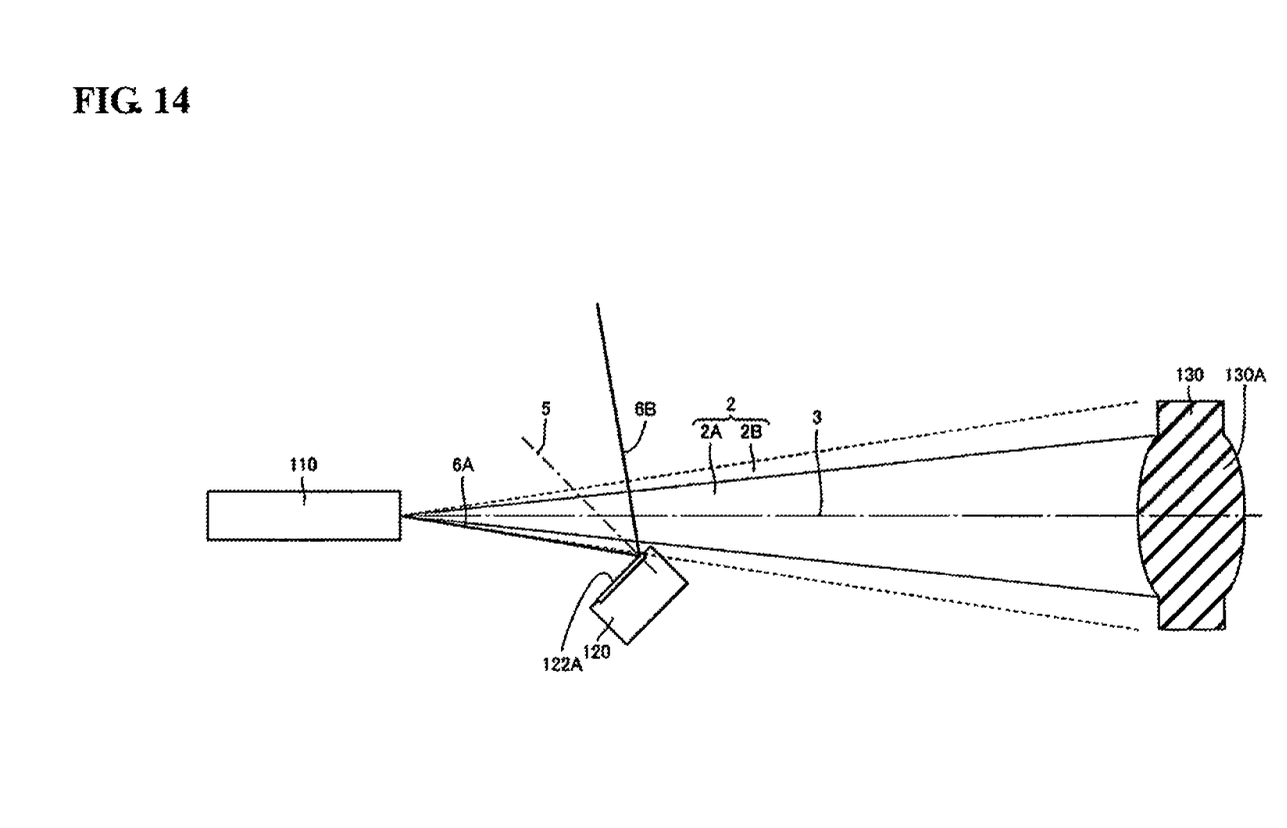
FIG. 14 is a schematic view illustrating the arrangement of a semiconductor light-emitting device and a light-receiving device in Example 5.
Figure 15:
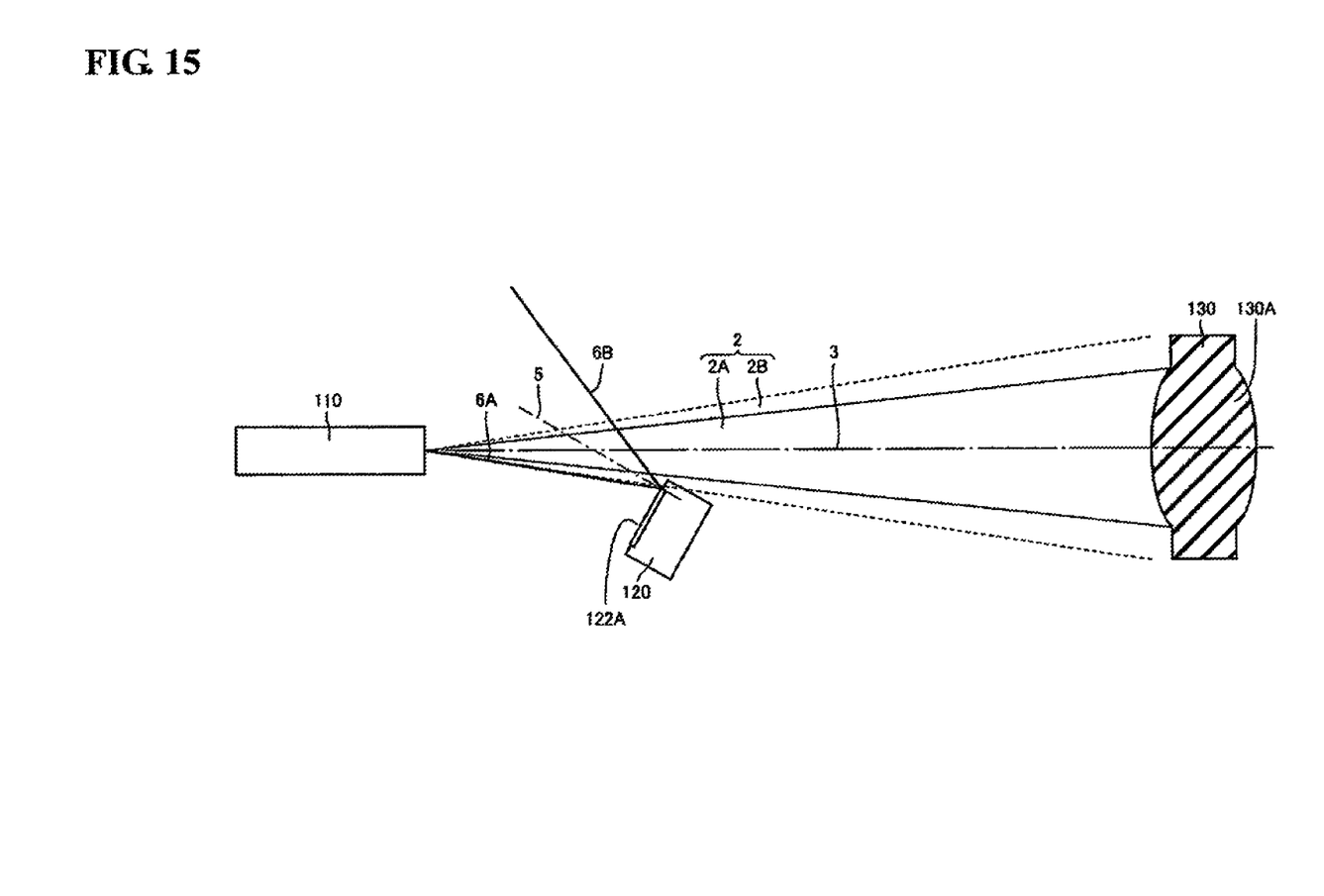
FIG. 15 is a schematic view illustrating the arrangement of a semiconductor light-emitting device and a light-receiving device in Example 6.

| No | Inclination angle θ (°) | Corresponding figures | Light-receiving sensitivity | | |
|---|---|---|---|---|---|
| | | | Stray light | Values of light-receiving sensitivity (*2) | Evaluation |
| 1 | 0 (*1) | FIG. 9 | C | 100 | A |
| 2 | 5 | FIG. 10 | B | 80 | A |
| 3 | 10 | FIG. 11 | A | 60 | A |
| 4 | 20 | FIG. 12 | A | 30 | A |
| 5 | 30 | FIG. 13 | A | 10 | A |
| 6 | 45 | FIG. 14 | A | 5 | B |
| 7 | 60 | FIG. 15 | A | 1 | C |

(*1) In this state, the light-receiving surface 122A of the photodiode 120 as a light-receiving device is parallel to the optical axis 3 of the laser diode 110 as a light-emitting device.
(*2) The values are expressed relative to the value (defined as 1) of light-receiving sensitivity of the photodiode 120 when the inclination angle θ is 60°.

In Table, No. 1 corresponds to Comparative Example, and No. 2 to No. 7 respectively correspond to Example 1 to Example 6. As described in Table, in No. 1 example (Comparative Example), the light-receiving sensitivity was good, but stray light was observed. By contrast, in the optical modules 1 of No. 2 to No. 7 examples corresponding to Examples, stray light was suppressed. For example, in No. 7 example in which the light-receiving surface 122A was inclined such that the inclination angle θ was 60°, stray light was sufficiently suppressed and the acceptable sensitivity was obtained. In No. 6 example in which the light-receiving surface 122A was inclined such that the inclination angle θ was 45°, stray light was suppressed and the light-receiving sensitivity was good. Good evaluation results were obtained for both of stray light and the light-receiving sensitivity in No. 3 example in which the inclination angle θ was 10°, No. 4 example in which the inclination angle θ was 20°, and No. 5 example in which the inclination angle θ was 30°. In No. 2 example in which the inclination angle θ was 5°, stray light was slightly observed, but stray light is considerably suppressed compared with No. 1 example corresponding to Comparative Example.

The above-described results corresponding to Examples have demonstrated that optical modules according to this embodiment enable suppression of stray light.

Embodiments and Examples disclosed herein are mere examples in all respects and should be understood as placing no limitations in any perspective. The scope of the present invention is defined not by the above-described description, but by Claims. The scope of the present invention is intended to embrace all the modifications within the meaning and range of equivalency of the Claims.

What is claimed is:

1. An optical module comprising:
   a light-forming part configured to form light; and
   a protective member that includes an output window configured to transmit light from the light-forming part and that is disposed so as to surround the light-forming part,
   wherein the light-forming part includes
      a base member,
      a semiconductor light-emitting device mounted on the base member,
      a lens mounted on the base member and configured to convert, in terms of spot size, light emitted from the semiconductor light-emitting device, and
      a light-receiving device that is mounted on the base member, that is disposed, in an emission direction of the semiconductor light-emitting device, between the semiconductor light-emitting device and the lens, that includes a light-receiving surface, and that is configured to directly receive, at the light-receiving surface, light from the semiconductor light-emitting device, and
   wherein the light-receiving surface inclines toward an emission portion of the semiconductor light-emitting device such that an inclination angle is more than 0° and 90° or less, the inclination angle being an angle formed between an optical axis of the semiconductor light-emitting device and a plane including the light-receiving surface of the light-receiving device.

2. The optical module according to claim 1, wherein the inclination angle is 5° or more.

3. The optical module according to claim 1, wherein the inclination angle is 45° or less.

4. The optical module according to claim 1, wherein the inclination angle is 30° or less.

5. The optical module according to claim 1, wherein the semiconductor light-emitting device is a laser diode.

6. The optical module according to claim 1, wherein the light-forming part includes
   a plurality of the semiconductor light-emitting devices mounted on the base member,
   a plurality of the lenses mounted on the base member, and disposed so as to individually correspond to the plurality of semiconductor light-emitting devices,
   the light-receiving device mounted on the base member, and disposed so as to correspond to at least one semiconductor light-emitting device of the plurality of semiconductor light-emitting devices, and
   a wavelength selective filter mounted on the base member, and configured to multiplex light from the plurality of semiconductor light-emitting devices.

7. The optical module according to claim 6, wherein the plurality of semiconductor light-emitting devices include a semiconductor light-emitting device configured to emit red light, a semiconductor light-emitting device configured to emit green light, and a semiconductor light-emitting device configured to emit blue light.

* * * * *